F. B. ANDERSON.
CENTRIFUGAL DRIER.
APPLICATION FILED SEPT. 25, 1911.
1,122,460.
Patented Dec. 29, 1914.
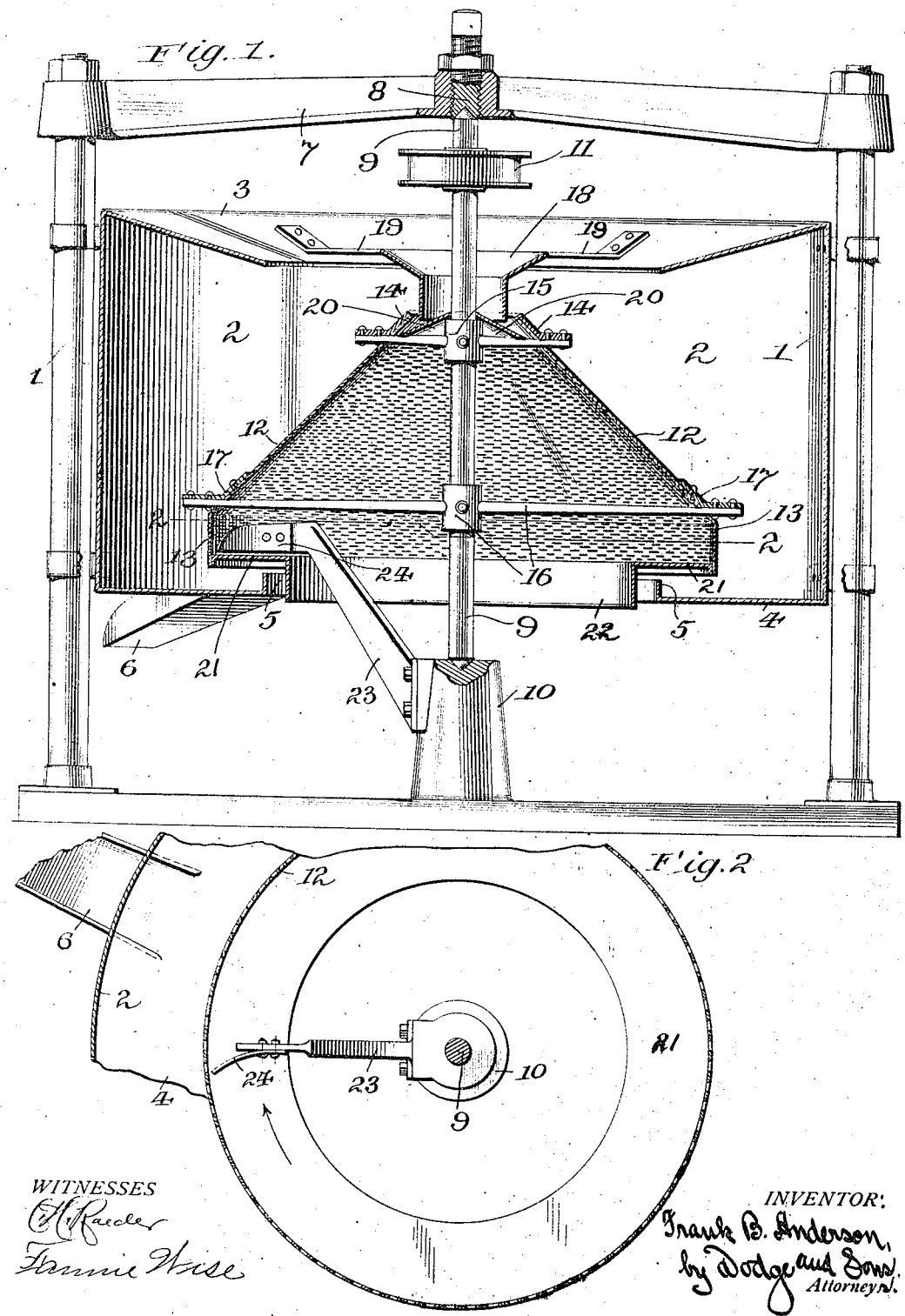
WITNESSES
INVENTOR:
Frank B. Anderson,
by Dodge and Sons
Attorneys.

UNITED STATES PATENT OFFICE.

FRANK B. ANDERSON, OF CLEVELAND, OHIO, ASSIGNOR OF ONE-THIRD TO CHARLES O. ANDERSON AND ONE-THIRD TO ALBERT D. ANDERSON, BOTH OF CLEVELAND, OHIO.

CENTRIFUGAL DRIER.

1,122,460.  Specification of Letters Patent.  Patented Dec. 29, 1914.

Application filed September 25, 1911. Serial No. 651,212. REISSUED

*To all whom it may concern:*

Be it known that I, FRANK B. ANDERSON, a citizen of the United States, residing at Cleveland, in the county of Cuyahoga and State of Ohio, have invented certain new and useful Improvements in Centrifugal Driers, of which the following is a specification.

My present invention pertains to driers, the construction and advantages of which will be hereinafter set forth, reference being had to the annexed drawings, wherein:

Figure 1 is a vertical sectional view of the drier; and Fig. 2 a horizontal sectional view, taken on the line 2—2 of Fig. 1.

The main object of the present invention resides in the production of a centrifugal drier which is continuous in its action, that is to say, one into which the material may be continuously fed and automatically withdrawn or discharged.

In the drawings, 1 denotes suitable posts or columns, to which is secured a cylindrical housing or chamber 2, provided with a top 3, having a central opening or aperture formed therein. The bottom 4 of said chamber or housing is provided with an upstanding rim or collar 5, which defines the relatively large opening which is provided in the bottom. Said chamber is adapted to collect all the liquid or liquid matter which may be thrown off by the machine, and such matter is discharged through a spout 6 which opens into the chamber.

A cross-bar 7 is secured to the upper ends of columns 1, and in it is secured an adjustable bearing 8 for the upper end of a shaft 9, the lower end of the shaft finding its bearing in a block or base piece 10. A pulley 11 is secured to the shaft, preferably at a point above the top 3, and by means of this pulley rapid motion is imparted to the shaft and the material holding and conveying screen carried thereby. The screen, which is formed of foraminous metal, such as punched sheet metal, has the general form of a truncated cone, comprising a cone-shaped section 12 and a depending skirt 13, said skirt section being substantially vertical. The screen is secured at its upper end to a flanged flaring collar 14, which in turn is secured to the arms of a spider frame 15 which is secured to the shaft 9. A second spider-frame 16 is secured to the shaft and to the outer ends of the arms thereof is attached an L-shaped hoop 17 which in turn is riveted or otherwise secured to the screen adjacent to the base of the cone-shaped portion 12.

A feed hopper 18, supported by suitable arms or brackets 19, extending inwardly from the top 3, projects downwardly to a slight extent into the collar 14 and discharges the material to be treated onto a conical spreader or deflector 20, supported by the shaft and the upper spider frame 15.

Secured to the lower margin of the vertical section 13 of the screen and extending inwardly therefrom in a horizontal direction is an annular shelf 21, said shelf being preferably formed of a solid or imperforate material and having extending downwardly from its inner portion a skirt or flange 22. The parts are so proportioned that the skirt extends through, but out of contact with, the rim 5 and preferably extends to a point slightly below the bottom 4.

A scraper or take-off device is provided for removing the accumulated material from the shelf, and in the form illustrated comprises an arm 23 the outer lower end of which is fixed to the base piece 10, the inner end of said arm extending inwardly and overlying the shelf. A plow or scraper 24 is detachably secured to said inner end, and preferably will be curved so as to throw the dried material off the shelf into a suitable receptacle or conveyer which will be placed below the opening defined by the skirt 22.

The operation of the apparatus is as follows: The material to be dried is fed into the hopper 18, and passing onto the deflector is carried outwardly into contact with the rapidly rotating screen 12, through the meshes of which the liquid will pass, while the solids are retained, and with greater or less speed, according to the character of the material undergoing treatment and the rapidity of rotation of the screen, said solids will pass downwardly along the screen surface and finally find lodgment upon the shelf 21. The material will tend to bank upon the shelf and against the skirt section 13 of the screen and will be removed and discharged from the machine by the plow or scraper 24. The material which is discharged will be found to be dry.

It is conceivable that the depending skirt or screen section 13 may be dispensed with when treating certain materials, the main function of said section being to cause the material to bank up on the shelf 21, and to thus prevent the material from passing downwardly upon the screen and out of the machine too rapidly.

The apparatus is such that the material may be constantly fed into the same, whereby a continuous operation is obtainable, a point of manifest advantage.

Having thus described my invention, what I claim is:

1. In a centrifugal drier, the combination of a cone-shaped screen; means for introducing material to the upper end of the same and against the inner surface thereof; means for rotating the screen; a shelf extending inwardly from the lower end of the screen, said shelf rotating therewith; and a scraper overlying said shelf adapted to remove the material from the same while the screen is in rotation.

2. In a centrifugal drier, the combination of a cone-shaped screen; means for introducing material to and against the upper portion of the inner surface thereof; means for arresting the material at the lower end of the screen and continuously removing the same while the screen is in rotation; and means for rotating the screen.

3. In a centrifugal drier, the combination of a cone-shaped screen; means for rotating the same; a shelf extending inwardly from the lower edge of the screen; and means for continuously removing the accumulated material from the shelf while the screen is in rotation.

4. In a centrifugal drier, the combination of a cone-shaped screen; means for rotating the same; an annular shelf extending inwardly from the lower edge of the screen and rotatable therewith; and a fixed scraper overlying the shelf.

5. In a centrifugal drier, the combination of a cone-shaped screen, a perforate skirt depending therefrom and movable therewith; an annular shelf extending inwardly from the lower end of the skirt; a scraper overlying the shelf; and means for rotating the screen.

6. In a centrifugal drier, the combination of a cone-shaped screen; means for rotating the same; an inwardly-projecting shelf located adjacent the lower end of the screen, said shelf being fixed with reference to the screen and rotatable therewith; and means for continuously removing material which accumulates upon the shelf while the screen is in rotation.

7. In a centrifugal drier, the combination of a cone-shaped screen; means for rotating the same; an inwardly-projecting shelf located adjacent the lower end of the screen, said shelf being fixed with reference to the screen and rotatable therewith; a fixed arm extending into the lower portion of the screen; and a plow or scraper secured to the inner end of said arm and overlying the shelf, said plow or scraper being curved and adapted to cut away and remove the material which accumulates upon the shelf and the adjacent portion of the screen.

In testimony whereof I have signed my name to this specification in the presence of two subscribing witnesses.

FRANK B. ANDERSON.

Witnesses:
 B. F. SEELEY,
 C. W. TOLAND.